March 11, 1930.     E. WINARSKY     1,750,206
REDUCING VALVE
Filed May 15, 1929
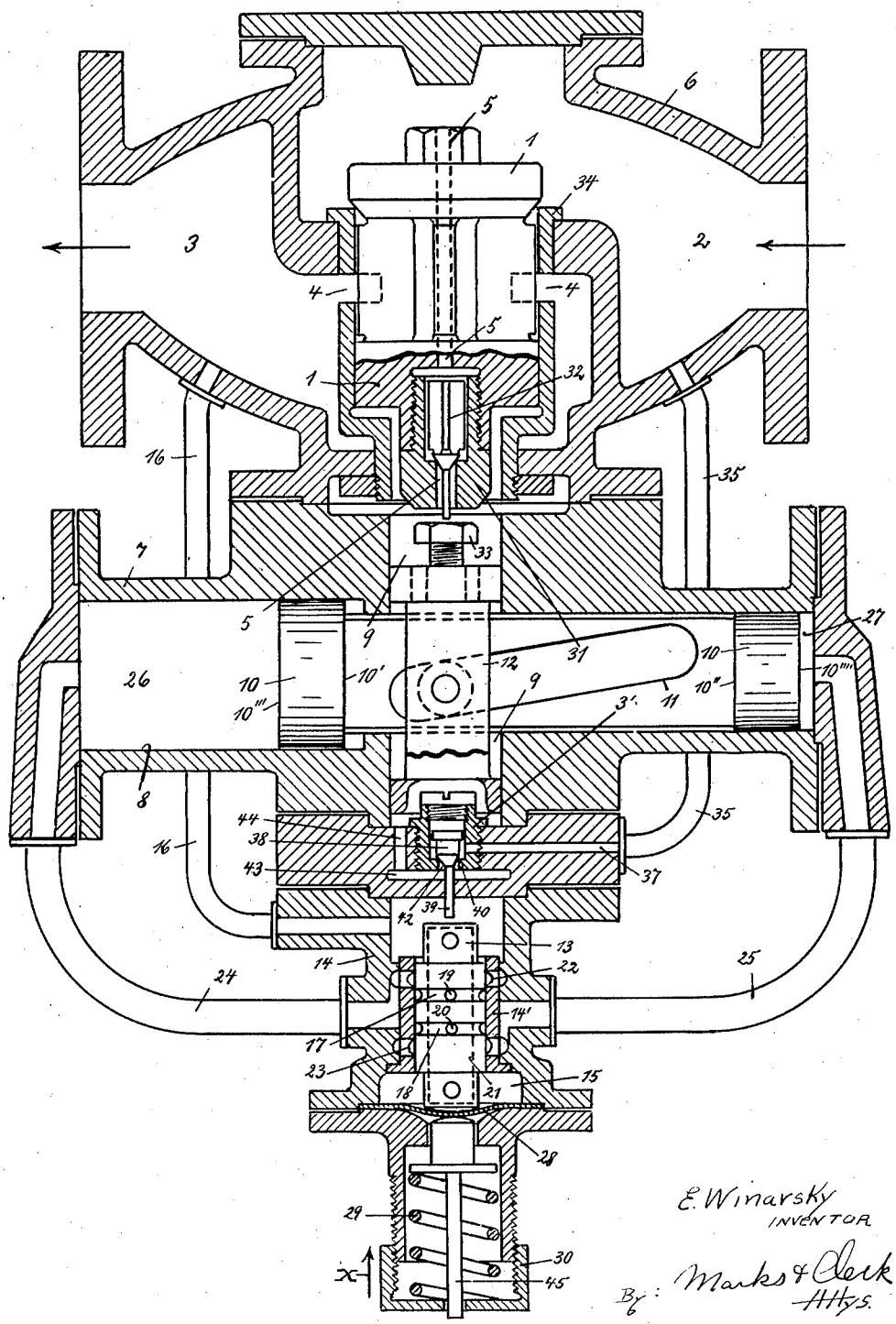
E. Winarsky
INVENTOR
By: Marks & Clerk
Attys.

Patented Mar. 11, 1930

1,750,206

UNITED STATES PATENT OFFICE

EDMUND WINARSKY, OF BRUNSWICK, GERMANY

REDUCING VALVE

Application filed May 15, 1929, Serial No. 363,285, and in Germany October 31, 1927.

This invention relates to reducing valves in which the controlling device (a diaphragm or the like) which is adjustable to the desired working pressure, and is dependent on the low pressure or on the high pressure, allows the fluid (steam or water) to come into driving action upon the driving member (a piston or the like) for the valve cone, sometimes in one direction of movement and sometimes in the other. In such valves the movement of the actual driving means (the piston or the like) for the reducing valve cone is therefore not directly associated with the controlling device (diaphragm), so the reducing valve cone can re-act upon its driving member and set the latter in motion. On this ground, therefore, in these known constructions, the valve only returns slowly into its normal or adjusted open position when its condition of equilibrium has once been disturbed by altering the working conditions, as by increase or decrease of consumption. This is a great disadvantage, because every movement of the valve produces variations of pressure in its turn. The object of the present invention is to eliminate this disadvantage. According to the invention the actual driving member for the valve, for instance a piston or the like, has its movement brought into such relationship to that of the valve that although the driving member can move the valve cone, the valve cone cannot move its driving member.

A constructional form which is to be regarded as an example of the invention, but to which the invention is not limited, is illustrated in the accompanying drawing in cross-sectional elevation in the form of a pressure-regulating valve, the valve body of which is balanced both towards the high-pressure side and towards the low-pressure side.

In this drawing, the valve body 1 is relieved in a known manner both towards the high-pressure side 2 and towards the low-pressure side 3 by means of ducts 5 and apertures 4 respectively. With the valve casing 6 is connected a casing 7, which has a cylinder bore 8 at right angles to the axis of the valve. In this bore, which communicates by means of the aforementioned ducts 5 and a bore 9 in the casing 7 with the high pressure, there slides a sliding member or piston 10, which has an inclined surface 11 and four pressure surfaces, of which the surfaces 10' and 10'' are intended to be acted upon by the high pressure, while the surfaces 10''' and 10'''' are intended to be acted upon by the low pressure. These pressure piston surfaces, however, do not make fluid-tight contact with the cylinder wall 8 but permit of a gradual passage of pressure fluid from one working side to the other. Upon the inclined surface 11 there bears a sliding piece 12, displaceable in the bore 9, in such a way that it is raised and lowered by the reciprocation of the sliding member 10, and thereby exerts an opening or closing action upon the valve cone. Upon the sliding piece 12 there bears for this purpose, under the influence of the pressure of flow, the valve 1, which is accordingly raised and lowered during the reciprocation of the sliding member 10. The inclined working surface 11 in every position prevents a spontaneous movement of the sliding piece 12 and therefore also a spontaneous movement of the valve 1, which, as stated, always tends to move downwards under the pressure of flow of the fluid. In the constructional example illustrated, the valve 1 rests, with a nut 31 which has an axial recess turned in it and which enables an auxiliary valve 32 to be inserted into the valve body 1 to close the duct 5, upon an adjustable screw 33 in the sliding piece 12. This screw 33 is secured to its carrier 12 in such a way that when the slide 10 is shifted right over to the right, as shown, the valve 1 resting upon its seat 34 is released from the supporting screw 33 and the auxiliary valve 32 has closed the duct 5. This auxiliary valve 32, when in a closed condition, prevents the entrance of high pressure into the slide cylinder 8, but conversely when the slide 10 moves towards the left the auxiliary valve is raised before the main valve 1 opens, so that the high pressure can then flow into the cylinder space 8 through the duct 5.

For the controlling of the movements of the slide there serves a cylindrical slide valve 13, which slides in a special casing 14, and the receiving chamber 15 of which is connected by a pipe 16 with the low-pressure side 3. The controlling slide valve 13, which, in the example illustrated, is movable perpendicularly, has annular grooves 17 and 18 turned in its cylindrical surface, which communicate through bores 19 and 20 with the slide valve cavity 21 (15) in which the low pressure prevails. Annular passages 22 and 23 in the casing wall 14, or in a stationary intermediate sleeve 14', are connected by pipes 24 and 25 with the left hand and right hand pressure spaces 26 and 27 respectively, of the slide cylinder 8. By raising and lowering the controlling slide valve 13, one annular passage, 17 or 18, can be connected with the pipe 24 or 25. In its central position the slide valve 13, as shown, cuts off those annular passages 17 and 18 from both pipes 24 and 25. The controlling slide valve 13 bears upon a diaphragm 28, and in particular upon that side thereof which is exposed to the low pressure for example, the diaphragm being loaded on the opposite side in a manner known in itself by an adjustable spring 29, which regulates the desired normal low pressure. For the adjustment of this spring there may serve for instance a screw cap 30.

The bore 9 which receives the sliding piece or bolt 12 is connected with the high-pressure side 2 not only by the duct 5 but also by a pipe 35, which opens into a cap 36, either directly or through an intermediate passage 37. The connection is normally shut off by a non-return valve 38. It can be established, for a purpose to be hereinafter explained, by the slide valve 13, if the latter, in its upward movement, pushes under the pin 39 of the non-return valve 38 and lifts the latter off its seat 40. In this case the high pressure admitted by the pipe 35 flows through the cap 36 and the passages 42, 43 and 44 into the bore 9, from which it then passes to one side of the slide.

This new apparatus acts in the following manner:—

The drawing shows the regulator in its closed position. In order to set it in operation, the adjusting nut or cap 30 is screwed forward in the direction of the arrow $x$, the screw rod 45 lifting the non-return valve 38 off its seat 40 by means of the diaphragm 28 and the slide valve 13. The slide valve 13 then passes with its annular passage 17 over the annular passage 22, as a result of which the pressure space 26 of the slide 10 is connected through the pipe 24 with the space 15, 21, and by the pipe 16 with the low-pressure side 3, which is initially without pressure. The high pressure flowing through the valve 38 into the bore 9 and through the latter into the cylinder 8 penetrates past the pressure surfaces of the slide 10, which are not quite fluid-tight, into the spaces 26 and 27. Since the former, 26, as stated, is opened towards the low-pressure side, the high pressure acting in the chamber 27 pushes the slide 10 towards the left, as a result of which the sliding piece 12 is raised and the valve 1 thereby opened. The pressure arising on the low-pressure side 3 is imparted through the pipe 16 to the space 15, and acts upon the diaphragm 28, which it presses downwards, compressing the spring 29. The controlling slide valve 13 bearing upon the diaphragm then descends, in such a way that its annular passages 17 and 18 move into a central position between the annular passages 22 and 23 in the casing, as a result of which the slide-valve chamber 15, 21 is shut off from both the slide-pressure chambers 26 and 27. This is the normal operative condition, which admits of being adjusted at will by rotating the positioning member 30, with the assistance of a scale if necessary. The valve 1 which tends to close in the direction of flow, is thus hindered, by the inclined surface 11 (slide 10), from causing, by spontaneous movements, a displacement of the slide, and therefore an alteration in the working condition. If the low pressure in the consumption chamber 3 subsequently falls or rises, the pressure upon the diaphragm 28 also falls or rises, and the diaphragm is either raised by the spring 29 or lowered by the increasing pressure in the chamber 15. The consequence of this is that the controlling slide valve 13 opens one of the spaces 26, 27, which are kept under high pressure by the opened auxiliary valve 32, towards the low-pressure side 15, 21, namely the high-pressure space 26 when the pressure in the space 3 falls, and the high pressure space 27 when the pressure in the space 3 rises. The slide 10, moving towards the left or right out of its mid position, always re-establishes the desired working pressure in the space 3 by raising or lowering the valve 1.

If during operation the pressure in the low-pressure space 3 rises above the normal limit, the slide 10 slides into the end position shown, in which it allows the valve 1, and also its auxiliary valve 32, to come into the closed position. Since in this manner all access of high pressure to the slide 10 is cut off, the latter would remain in this end position if the above-mentioned non-return valve 38 were not provided, for as soon as the low-pressure space 3 becomes free from pressure after the shutting off of the high pressure, whereby also the controlling slide valve chamber 15, 21 becomes pressureless, the spring 29 presses upwards the unloaded diaphragm 28, and therefore also the slide valve 13, which opens the valve 38 by means of the pin 29. The high pressure flows through the pipes 35 and 37 and the passages 42, 43 and 44 into the space 9 and re-establishes the working condition in the manner hereinbefore described. Furthermore the valve 38 also has the advantage that it constantly presses the controlling slide valve 13 downwards, this being effected with the full high pressure (pipe 35) in the closed position, but with the difference between the full high pressure and the lower pressure acting upon the cross section of the pin 39 when in operation. It may for example thereby be made unnecessary to provide a spring which would have to press the readily movable slide valve 13 constantly against the diaphragm 28.

As compared with a rigid connection between the main valve 1 and the slide 10, the arrangement described, according to which the valve 1 is carried uncoupled by the slide bolt 12, has the advantage that during the closing of the valve its connection with its drive 10, 12 is released, as shown. Consequently the valve settles upon its seat 34, against which it is then pressed in a fluid-tight manner without jerking, as soon as its auxiliary valve 32 is also released from the drive (bearing nut 33), and closes.

The driving means 10 for the valve cone 1 itself can also be held fast against spontaneous movements if the piston surfaces of the driving means are made of different sizes, as shown in the drawing. If the left hand piston surface is given a larger cross-sectional area, the driving means 10 moves towards the left, when the pressure-fluid load is uniform, that is, when the two pressure spaces 26 and 27 are at the same low pressure, under the influence of the high pressure by-passing the displacement, as a result of which the main valve 1 opens more, which results in an increase in the low pressure. The increased low pressure moves the diaphragm 28 and the slide valve 13 downwards, the passage 24 for the left hand pressure space 26 is closed, and the passage 25 for the right hand pressure space 27 is opened.

The pressure space 27 is thereby placed in open communication with the low-pressure side 2 of the valve. The high pressure that passes owing to the leakiness of the working piston 10 can thus always escape so that on the working surface of the slide 10 only pure low pressure acts. By the closure of the left hand pressure space there comes into action therein the high pressure that passes owing to the leakiness of the working piston, in such a form that the low pressure here prevailing is raised. The driving means 10 is thereby displaced so far towards the right, and at the same time the main cone 1 diminishes the cross-sectional area by such a large amount, that the product obtained by multiplying the increased low pressure by the large piston area (left) is equal to the product obtained by multiplying the low pressure by the small piston area (right). In this normal position the slide valve is opened downwards (right hand passage).

Accordingly the driving means will always be subject to a definite pressure, such for example as is obtained in other systems by means of weights with lever transmission or springs. A further advantage is that the pressure or load, in any position of the driving means, is the same, and cannot be altered, as in the case of valves with weighted levers, by angular displacement or by compression and expansion of springs.

What I claim is:—

1. A pressure reducing valve, comprising a valve cone, a cylindrical chamber, a driving slide capable of moving longitudinally in the cylindrical chamber, pipes for connecting the ends of the cylindrical chamber with the high-pressure and low pressure sides of the pressure-reducing valve, a controlling device adapted to open and close the said pipes, means for adjusting the controlling device to a desired pressure, and an inclined guiding surface on the driving slide adapted to control the ascent and descent of the valve cone as the driving slide moves longitudinally, without allowing spontaneous movements of the valve cone to be transmitted to the driving slide.

2. A pressure reducing valve, comprising a valve cone, a cylindrical chamber, a driving slide capable of moving longitudinally in the cylindrical chamber, pipes for connecting the ends of the cylindrical chamber with the high-pressure and low pressure sides of the pressure-reducing valve, a controlling device adapted to open and close the said pipes, means for adjusting the controlling device to a desired pressure, an inclined guiding surface on the driving slide adapted to control the ascent and descent of the valve cone as the driving slide moves longitudinally, without allowing spontaneous movements of the valve cone to be transmitted to the driving slide, and the driving slide being free to continue its longitudinal movement in the closing direction after the pressure reducing valve is completely closed.

3. A pressure reducing valve, comprising a valve cone, a differential cylindrical chamber, a driving slide capable of moving longitudinally in the cylindrical chamber, the said driving slide consisting of two pistons of different diameters, one working in each part of the differential cylindrical chamber, and a rigid member holding the two pistons in fixed relationship to one another, pipes for connecting the ends of the cylindrical chamber with the high-pressure and low pressure sides of the pressure-reducing valve, a controlling device adapted to open and close the said pipes, means for adjusting the controlling device to a desired pressure, and an inclined guiding surface on the driving slide adapted to control the ascent and descent of the valve cone as the driving slide moves longitudinally, without allowing spontaneous movements of the valve cone to be transmitted to the driving slide.

4. A pressure reducing valve, comprising a valve cone, a cylindrical chamber the axis of which is at right angles to the axis of the valve cone, a driving slide capable of moving longitudinally in the cylindrical chamber, pipes for connecting the ends of the cylindrical chamber with the high-pressure and low pressure sides of the pressure-reducing valve, a controlling device such as a diaphragm adapted to open and close the said pipes, means for adjusting the controlling device to a desired pressure, and an inclined cam surface on the driving slide adapted to control the ascent and descent of the valve cone as the driving slide moves longitudinally, without allowing spontaneous movements of the valve cone to be transmitted to the driving slide.

5. A pressure reducing valve, comprising a valve cone, a cylindrical chamber the axis of which is at right angles to the axis of the valve cone, a driving slide capable of moving longitudinally in the cylindrical chamber, pipes for connecting the ends of the cylindrical chamber with the high-pressure and low pressure sides of the pressure-reducing valve, a controlling device adapted to open and close the said pipes, means for adjusting the controlling device to a desired pressure, a movable member capable of exerting a push against the valve cone in the opening direction, but not so attached to the valve cone as to be capable of pulling it in the closing direction, and an inclined cam surface on the driving slide adapted to move the said movable member in the direction of the opening movement of the valve cone and in the opposite direction as the driving slide moves longitudinally in one direction and the other.

6. A pressure reducing valve, comprising a valve cone, a cylindrical chamber the axis of which is at right angles to the axis of the valve cone, a driving slide capable of moving longitudinally in the cylindrical chamber, pipes for connecting the ends of the cylindrical chamber with the high-pressure and low pressure sides of the pressure-reducing valve, a controlling device adapted to open and close the said pipes, means for adjusting the controlling device to a desired pressure, a movable member capable of exerting a push against the valve cone in the opening direction, but not so attached to the valve cone as to be capable of pulling it in the closing direction, and an inclined cam surface on the driving slide adapted to move the said movable member in the direction of the opening movement of the valve cone and in the opposite direction as the driving slide moves longitudinally in one direction and the other, the driving slide being free to continue its longitudinal movement in the closing direction after the pressure reducing valve is completely closed.

7. A pressure reducing valve, comprising a valve cone, a cylindrical chamber, a driving slide capable of moving longitudinally in the cylindrical chamber, a slide valve chamber, a pipe permanently connecting the slide valve chamber with the low-pressure side of the pressure reducing valve, means for putting the slide valve chamber into communication with the high-pressure side of the pressure reducing valve, pipes communicating with the ends of the cylindrical chamber, a slide valve movable in the slide valve chamber and adapted to open and close communication between the last mentioned pipes and the slide valve chamber, a controlling device adapted to control the movements of the slide valve, means for adjusting the controlling device to a desired pressure, and an inclined guiding surface on the driving slide adapted to control the ascent and descent of the valve cone as the driving slide moves longitudinally, without allowing spontaneous movements of the valve cone to be transmitted to the driving slide.

8. A pressure reducing valve, comprising a valve cone, a cylindrical chamber, a driving slide capable of moving longitudinally in the cylindrical chamber, a slide valve chamber, a pipe permanently connecting the slide valve chamber with the low-pressure side of the pressure reducing valve, means for putting the slide valve chamber into communication with the high-pressure side of the pressure reducing valve, means for putting the cylindrical chamber into communication with the high-pressure side of the pressure reducing valve, a stop valve normally disconnecting the slide valve chamber and the cylindrical chamber from the high-pressure side of the pressure reducing valve, pipes communicating with the ends of the cylindrical chamber, a slide valve movable in the slide valve chamber and adapted to open and close communication between the last mentioned pipes and the slide valve chamber, a slide valve being adapted to open the stop valve when the pressure reducing valve is to be moved away from its closed position, and a controlling device adapted to control the movements of the slide valve.

9. A pressure reducing valve, comprising a valve cone, a differential cylindrical chamber the axis of which is at right angles to the axis of the valve cone, a driving slide capable of moving longitudinally in the cylindrical chamber, the said driving slide consisting of two pistons of different diameters, one working in each part of the differential cylindrical chamber, and a rigid member holding the two pistons in fixed relationship to one another, a slide valve chamber, a pipe permanently connecting the slide valve chamber with the low-pressure side of the pressure reducing valve, means for putting the slide valve chamber into communication with the high-pressure side of the pressure reducing valve, means for putting the cylindrical chamber into communication with the high-pressure side of the pressure reducing valve, a stop valve normally disconnecting the slide valve chamber and the cylindrical chamber from the high-pressure side of the pressure reducing valve, pipes communicating with the ends of the cylindrical chamber, a slide valve movable in the slide valve chamber and adapted to open and close communication between the last mentioned pipes and the slide valve chamber, said slide valve being adapted to open the stop valve when the pressure reducing valve is to be moved away from its closed position, a controlling device adapted to control the movements of the slide valve, one side of the controlling device being acted upon by the fluid pressure in the slide valve chamber, means for applying pressure to the other side of the controlling device, means for manually adjusting the said pressure, a movable member capable of exerting a push against the valve cone in the opening direction, but not so attached to the valve cone as to be capable of pulling it in the closing direction, and an inclined cam surface on the driving slide adapted to move the said movable member in the direction of the opening movement of the valve cone and in the opposite direction as the driving slide moves longitudinally in one direction and the other, the driving slide being free to continue its longitudinal movement in the closing direction after the pressure reducing valve is completely closed.

In testimony whereof I have signed my name to this specification.

EDMUND WINARSKY.